Jan. 6, 1942.   H. C. TINGEY   2,268,678
PROCESS FOR MANUFACTURING PATTERNED RUBBER SHEETS
Filed Jan. 3, 1941
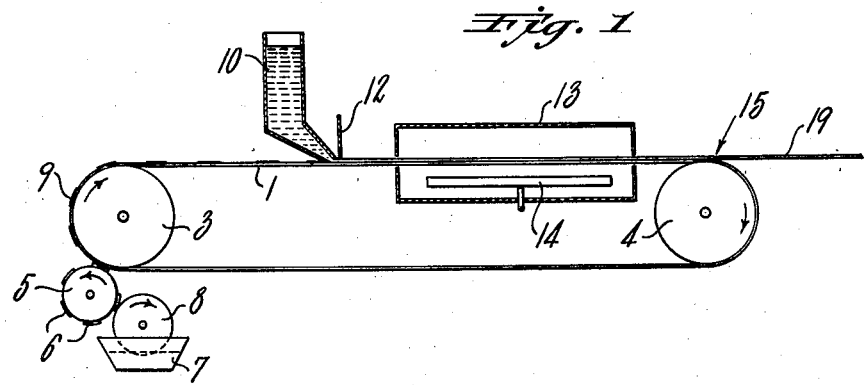
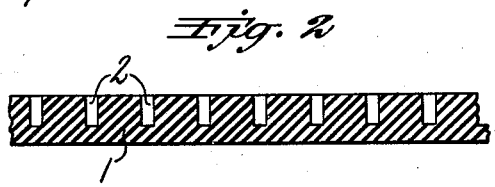
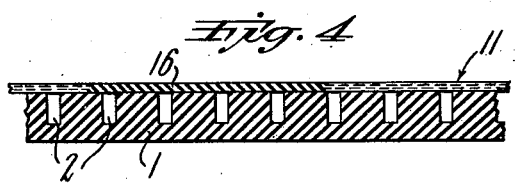
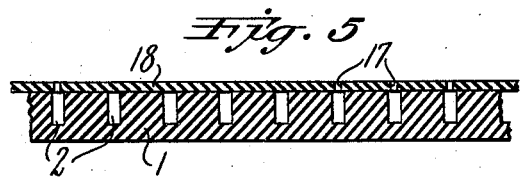
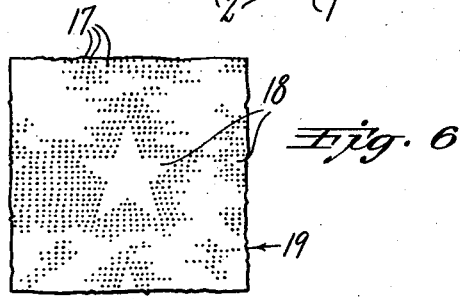
INVENTOR.
Harold C. Tingey
BY
ATTORNEY Patented Jan. 6, 1942

2,268,678

UNITED STATES PATENT OFFICE 2,268,678

PROCESS FOR MANUFACTURING PATTERNED RUBBER SHEETS

Harold C. Tingey, Nutley, N. J., assignor to United States Rubber Company, New York, N. Y., a corporation of New Jersey Application January 3, 1941, Serial No. 373,003

10 Claims. (Cl. 18—57)

This invention relates to the manufacture of films or sheets having perforations therein defining or outlining a pattern, and more particularly to rubber sheets having holes, that is, perforations or cavities, arranged to define or to outline a solid design.

According to United States Letters Patent No. 2,032,942 perforate rubber films or sheets are made by spreading a latex composition onto an air-impermeable deposition blanket having a multiplicity of cavities or pits in its deposition surface, so as to entrap air within the cavities or pits of the blanket. The process is then continued by heating the blanket together with the spread latex film to a temperature sufficient to dry or gel the latex and to cause the entrapped air to expand and force its way through the wet or partially wet latex coating while it is drying or gelling, thereby forming permanent perforations in the spread film of latex composition. The film or coating, simultaneously with the heating of the backing and piercing by the jets of entrapped air, at least in the zones adjacent the perforations, becomes sufficiently set so that the perforations are fixed. The drying is then completed and the spreading and heating operations may be repeated until the desired total thickness of coating has been built up. The perforations formed in the initial layer of the coating permit perforation of the second and each successive layer in a similar manner so that the perforations extend continuously through the entire thickness of the coating.

The preferred blanket as described in the aforementioned patent is made by coating a woven fabric with rubber in such a manner that the meshes of the fabric are closed on one side of the fabric and remain open on the other side and the individual interstices are also sealed off one from the other by the coating and/or impregnation of the threads to provide a multitude of pockets opening upon the deposition face of the fabric. The usual perforate sheet made according to this method has perforations corresponding to the original mesh of the fabric, that is, the holes or pores extend longitudinally and laterally in aligned rows. Thus, a rubber film made from one of these blankets has a regular arrangement of the perforations throughout the entire perforate surface in a simple monotonous and repetitive pattern.

The present invention provides a method of producing designs or patterns, for example, lettering or figures, in perforate sheeting made according to the above or similar methods. The pattern comprises a solid areal portion or portions surrounded by or surrounding perforated areal portions, so that a design strikes the eye of the observer. Sheets of rubber made according to the present method may be provided with any desired arrangement of the holes or perforations although the original pattern of the deposition blanket or backing may have been formed with a series of regularly arranged perforations extending throughout the surface thereof. It is possible for the present invention to start with a backing identical with that described in the above cited patent, and to produce a rubber sheet or a rubber backing which is devoid of perforations in certain predetermined areas, even though the backing itself was provided with perforations corresponding to the solid or imperforate portions of the sheet formed thereon.

In practicing the present invention, a latex coagulant is applied to a selected portion of a deposition backing, and before or after partially drying the coagulant a layer of latex is deposited onto the backing thereby at least partially coagulating the selected portion of the latex layer, and subsequently the remainder of the latex layer is dried or gelled while concurrently piercing only that remainder with a plurality of fluid jets to form permanent perforations therein. The area selected for the deposit of the coagulant may be of any desired shape, it usually being preferred to apply it in the form of patterns or designs, numerals, printing, or the like, or in the form of stripes or bands.

Although the invention will for purposes of illustration be described in connection with the method of making perforate films from impermeable cavitied deposition blankets, it is obvious that other methods, for example, those involving the passage of a fluid through a latex film which has been deposited onto a perforate backing, may be equally effectively employed to produce the desired perforations in controlled arrangement as described herein. Referring to the accompanying drawing, a certain present preferred method of practicing the invention is illustrated, in which:

Fig. 1 is a diagrammatic view of apparatus for producing patterned perforate rubber sheeting;

Fig. 2 is a greatly enlarged cross-section of a deposition backing;

Fig. 3 shows the backing of Fig. 2 with a film of coagulant locally applied to the deposition surface thereof;

Fig. 4 shows a film of latex as applied to the backing prepared as in Fig. 3;

Fig. 5 shows the final latex film as formed on the backing; and

Fig. 6 is a plan view of sheeting made in accordance with the invention.

Referring to Fig. 1, convenient apparatus for performing the present process comprises an endless deposition blanket 1 of rubber having cavities 2 in the surface thereof and adapted to be driven around supporting rolls 3 and 4 which may be actuated in known manner to advance the deposition blanket which, as shown in Fig. 2, is preferably air-impervious and made of conveniently formed air-impervious flexible material, such as soft rubber. The deposition blanket may be manufactured, for example, in accordance with the method described in the co-pending application of John McGavack et al., Serial Number 273,448 filed May 13, 1939. A coagulant-depositing roller 5 having raised projections 6 extending from the circumferential surface thereof is adapted to be driven at a surface speed commensurate with that of the deposition blanket 1. A tank 7 for latex coagulant is associated with a pick-up roll 8 extending thereinto. The pick-up roll 8 and the deposit roll 5 may be driven in known manner, as for example by gears or by friction drive at the same speed as the deposition blanket 1 so that localized films 9 of coagulant may be deposited at desired areas on the deposition blanket. Latex from a source of supply, for example from a tank 10 is spread onto the upper surface of the deposition blanket to deposit a film 11 of latex onto the blanket, with the aid of a spreader bar 12. A drier 13 is shown as encompassing the upper reach of the deposition belt and may be provided with any desired type of heater shown conventionally at 14. A sheet or film of the latex may be withdrawn or stripped from the deposition blanket at 15.

In carrying out the present process by means of the above described apparatus, the deposition blanket is prepared by passing it in contact with the coagulant-depositing roll 5. As the roll 8 revolves, it picks up coagulant from the tank 7 and deposits it onto the raised portion 6 or printing members, of the roll 5. As successive printing elements 6 come in contact with successive portions of the deposition belt 1 they print or deposit successive films 9 of coagulant onto the deposition backing. The coagulant is of sufficient viscosity to form a continuous film, the entire surface of which may be contacted by subsequently deposited latex. As the belt travels forward it passes under the tank 10 which deposits a bank of latex thereon and the bank is spread by the spreader bar 12 to form the thin film 11 of fluid latex which bridges the cavities without filling them. The latex in the area coming in contact with the coagulant 9 immediately begins to coagulate or solidify in the coagulant-treated area 16. The belt, wihh the deposit thereon, then passes into the drier 13 wherein the air is expanded in the cavities 2 and is forced to blow through the liquid layer of latex 11 to form minute perforations 17. The at least partially coagulated latex in the area 16 contacting the coagulant 9 resists the pressure exerted by the expanded air in the perforations beneath that area. At the same time that the perforations 17 are being formed, the latex, at least in the vicinity of the perforations, is dried or gelled, and a predeterminately perforate sheet is thereby formed, leaving the solid areas 18 in designed or patterned contrast with the remainder of the perforate sheet. When the latex film reaches the point 15, it may, if desired, be returned around the circuit for subsequent deposites of latex, in order to increase its thickness. It is preferable at this time to remove the coagulant roll, since the solid portions 18 in the sheet are already determined and thereafter the action of the expanded air in the holes 2 of subsequently deposited latex will be limited to the areas of sheeting other than the localized solid portions 18. When the sheet has attained the desired thickness it may be stripped from the deposition blanket as a totally or partially dry film 19 and may then be subsequently completely dried and vulcanized.

Fig. 6 shows a patterned sheet in which the areas 18 comprise stars. Such a film or sheet may be produced by providing the projections 6 in the shape of stars, so that star-shaped depositions 9 of coagulant are printed on the deposition surface of the blanket. It is obvious that the shape and extent of the coagulant deposit 9 may be selected at will, and in some instances may be of such large area, that instead of the solid portions 18 appearing as the design, a multiplicity of adjacent perforations will appear as the outstanding design in contrast with the predominantly solid area of the film or sheet.

The invention may also be used in the production of patterned perforate rubber sheeting to form a plurality of identical rubber sheets. In this case, the initial patterned film may be formed as described above and may be permanently left on the deposition backing 1, thereby appearing as shown in Fig. 5. The blanket surface thereby formed may be treated, as by bromination, to render it non-adherent to successive latex coats or films. Subsequently deposits of latex from the tank 10 without the action of the coagulant inking roller 5 will produce sheets designed in accordance with the original application of the external film on the deposition backing. In this embodiment of the invention the result is the formation of a blanket having a selected pattern of cavities or holes.

The invention may also be employed in conjunction with other known methods of producing perforate rubber sheeting, for example, as described in United States Letters Patent No. 2,032,923, in which the deposition backing is a perforate as distinguished from a cavitied sheet. In practicing this invention air is blown directly through the perforations to pierce the deposited films of latex, but previously thereto the coagulant may be applied to the deposition surface of the backing as above described in order to effect initial chemical coagulation of localized areas of the deposited film. Other fluid media, such as a coagulant, may be employed in this embodiment of the invention to pierce the deposited latex film and to effect concurrent coagulation thereof in order to set the perforations in the predetermined areas. Suction means may likewise be employed to assist the passing of the piercing fluid through the wet portions of a deposited latex film.

Examples of suitable coagulants are: a saturated solution of magnesium acetate in a 50% water-alcohol mixture; a 20% solution of calcium nitrate in ethyl alcohol, a 25% aqueous solution of acetic acid; or in general any fluid or pasty material which is a coagulant for the latex compound used and which can be printed or otherwise applied to the deposition backing in a clearly defined pattern. It is necessary that the coagulant be sufficiently non-volatile so that it remains on the backing long enough to cause at least incipient coagulation of the deposited material. The coagulant solution may contain, in addition to the coagulant and solvent, materials to modify the viscosity of the solution and its power to wet the surface of the deposition backing. For accurate reproduction of the design, the coagulant solution should behave like a good printing ink: it should cover the desired portions of the surface uniformly and should neither retract from nor spread beyond those portions.

The term "latex" as employed in this specification and the appended claims designates broadly coagulable dispersions of elastic materials including artificial dispersions of rubber or rubber-like materials as well as natural latex which may be preserved or compounded or otherwise treated as desired, as by vulcanization, or which may be in normal, concentrated, diluted or purified condition produced by methods well known in the art.

Having thus described my invention what I claim and desire to protect by Letters Patent is:

1. A process which comprises applying a latex coagulant to a selected portion of a deposition backing, at least partially drying the coagulant, depositing a layer of latex onto the backing whereby at least partially coagulating a selected portion of the latex layer, and subsequently concurrently drying or gelling the remainder of the latex layer and piercing only said remainder with a plurality of fluid jets to form permanent perforations therein.

2. A process which comprises applying a latex coagulant to a selected portion of a deposition backing, depositing a layer of latex onto the backing thereby at least partially coagulating a selected portion of the latex layer, and subsequently concurrently drying or gelling the remainder of the latex layer and piercing only said remainder with a plurality of fluid jets to form permanent perforations therein.

3. A process which comprises applying a latex coagulant to a selected portion of a deposition backing, depositing a layer of latex onto the backing thereby at least partially coagulating a selected portion of the latex layer, subsequently concurrently drying or gelling the remainder of the latex layer and piercing only said remainder with a plurality of fluid jets to form permanent perforations therein, and removing the perforate layer or sheet from the backing.

4. A process for making a rubber film having holes therein except in selected areas which comprises applying a latex coagulant to selected areas of an air impermeable backing having a multiplicity of cavities in the deposition surface thereof, then spreading a film of latex composition on said backing without filling said cavities thereby at least partially coagulating the coagulant-treated areas of said film, and subsequently heating the backing to cause air entrapped in those cavities beneath the uncoagulated latex to force its way through the latex coating while it is drying or gelling, to form permanent holes in said film corresponding to said cavities.

5. A process for making a rubber film having holes therein except in selected areas which comprises applying a latex coagulant to selected areas of an air impermeable backing having a multiplicity of cavities in the deposition surface thereof, then spreading a film of latex composition on said backing without filling said cavities thereby at least partially coagulating the coagulant-treated areas of said film, subsequently heating the backing to cause air entrapped in those cavities beneath the uncoagulated latex to force its way through the latex coating while it is drying or gelling to form permanent holes only in said film corresponding to said cavities, and removing the perforate film from the backing.

6. A process for producing rubber films having predeterminately positioned holes therein which comprises applying a latex coagulant to a selected area of a perforate deposition backing so as to bridge over some of the perforations therein, applying a film of latex to said backing without filling the perforations therein thereby at least partially coagulating the coagulant-treated area of said film, and subsequently concurrently forcing fluid jets through the perforations other than those in the coagulant-treated area, and coagulating or drying the uncoagulated latex.

7. A process for producing rubber films having predeterminately positioned holes therein which comprises applying a latex coagulant to a selected area of a perforate deposition backing so as to bridge over some of the perforations therein, applying a film of latex to said backing without filling the perforations therein thereby at least partially coagulating the coagulant-treated area of said film, subsequently concurrently forcing fluid jets through the perforations other than those in the coagulant-treated area, coagulating or drying the uncoagulated latex to form a perforate rubber sheet, and stripping said sheet from the backing.

8. A process for producing a sheet of rubber having a solid design area outlined by a multiplicity of perforations which comprises applying a film of latex coagulant in the form of a design to a deposition backing having a multiplicity of holes substantially throughout the deposition surface thereof, depositing a film of latex onto said deposition surface and over said film of coagulant so as to web over said holes thereby at least partially coagulating said latex film in the area thereof corresponding to said design, and subsequently concurrently exerting substantially equal fluid pressure from said holes against the inner face of the latex film whereby to pierce the uncoagulated portions of the film externally of the design and coagulating the latex film and drying to form a rubber sheet having perforations outlining the design, and stripping the sheet from the backing.

9. A process for producing a sheet of rubber having a solid design area outlined by a multiplicity of holes which comprises applying a film of latex coagulant in the form of a design to a deposition backing having a multiplicity of holes throughout the deposition surface thereof, depositing a film of latex onto said deposition surface thereby at least partially solidifying the film adjacent the coagulant, and subsequently piercing the fluid portions of the film with a plurality of fluid jets and concurrently therewith coagulating the latex film and drying to form permanent perforations therein corresponding to the pierced portions.

10. A process for producing a sheet of rubber having a solid design area outlined by a multiplicity of holes which comprises applying a film of latex coagulant in the form of a design to a deposition backing having a multiplicity of holes throughout the deposition surface thereof, depositing a film of latex onto said deposition surface thereby at least partially solidifying the film adjacent the coagulant, subsequently piercing the fluid portions of the film with a plurality of fluid jets and concurrently therewith coagulating the latex film and drying to form permanent perforations therein corresponding to the pierced portions, and removing the film from the backing.

HAROLD C. TINGEY.